United States Patent
Shih et al.

(10) Patent No.: US 10,212,302 B1
(45) Date of Patent: Feb. 19, 2019

(54) CLONING SYSTEM AND METHOD FOR MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventors: Kevin C. Shih, Irvine, CA (US); Milong Sabandith, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/680,385

(22) Filed: Aug. 18, 2017

(51) Int. Cl.
*H04N 1/00* (2006.01)
*H04N 1/32* (2006.01)

(52) U.S. Cl.
CPC ....... *H04N 1/00954* (2013.01); *H04N 1/0097* (2013.01); *H04N 1/00344* (2013.01); *H04N 1/00973* (2013.01); *H04N 1/32112* (2013.01); H04N 2201/0012 (2013.01); H04N 2201/0039 (2013.01); H04N 2201/0094 (2013.01); H04N 2201/3205 (2013.01); H04N 2201/3276 (2013.01)

(58) Field of Classification Search
None
See application file for complete search history.

(56) References Cited

U.S. PATENT DOCUMENTS

| | | | | |
|---|---|---|---|---|
| 8,169,637 B2* | 5/2012 | Matsumoto | ........... | G06F 3/1222 358/1.15 |
| 8,402,373 B2* | 3/2013 | Ferlitsch | ................. | G06F 9/451 715/733 |
| 8,467,076 B2* | 6/2013 | Ishimoto | ................. | H04L 43/10 358/1.13 |
| 8,804,168 B2* | 8/2014 | Nishikawa | ................ | G06F 8/65 358/1.13 |
| 9,658,843 B2* | 5/2017 | Nishikawa | .............. | G06F 8/654 |
| 2003/0063305 A1* | 4/2003 | McIntyre | ............... | G06K 15/00 358/1.13 |
| 2004/0172469 A1* | 9/2004 | Takahashi | ........... | H04L 43/0817 709/224 |
| 2008/0244043 A1* | 10/2008 | Kawai | ................. | H04L 41/0846 709/221 |
| 2010/0315670 A1* | 12/2010 | Kojima | ................. | G06F 3/1204 358/1.15 |
| 2012/0117383 A1* | 5/2012 | Kim | ......................... | G06F 8/63 713/165 |
| 2013/0086574 A1* | 4/2013 | Yada | ........................ | G06F 9/44 717/173 |
| 2014/0223424 A1* | 8/2014 | Han | ........................ | G06F 8/654 717/173 |
| 2015/0334262 A1* | 11/2015 | Tsuruoka | ........... | H04N 1/00973 358/1.13 |

* cited by examiner

Primary Examiner — Miya J Williams

(74) Attorney, Agent, or Firm — Ulmer & Berne LLP

(57) ABSTRACT

A system and method for multifunction peripheral cloning includes a device controller with a processor and associated memory and a network interface. Device configuration data is stored on the device for configuring device components such as a scan engine and a print engine. A controller processor of a multifunction peripheral designated as a leader device generates a master clone file from a copy of its device configuration data and communicates it to at least one networked multifunction peripheral via the network interface via a push to targeted devices or responsive to a request for a copy of the master clone file from follower devices.

7 Claims, 5 Drawing Sheets

Master Clones — 400

Showing 1 to 20 of 183

| Name ▲ — 410 | Model — 420 | Firmware — 430 | Description — 440 | Created On — 450 | |
|---|---|---|---|---|---|
| _A123 | ESTUDIO206 | T160SF0W2120 | A123 | 3/9/2017 11:24 AM | Actions ▽ |
| _CloneTest_EBN_REUSS | ESTUDIO2508A | T410SF0W1007 | NT Domain Authentication | 5/24/2016 11:15 AM | Actions ▽ |
| _CloneTest_EBN_WEISSH2 | ESTUDIO5005AC | T373SF0W1010 | Authentication - Disabled | 5/24/2016 11:16 AM | Actions ▽ |
| _CloneTest_EX1_BP1 | TOSHIBAe-STUDIO6540C | T130SF0W4120 | Other Domain Authentication | 5/24/2016 11:23 AM | Actions ▽ |
| _CloneTest_EX1_LOIRE | ESTUDIO206L | T160SF0W2131 | Authentication - Disabled | 5/24/2016 11:09 AM | Actions ▽ |
| _CloneTest_EX1_MASH | ESTUDIO4540CS | T140SF0W4000 | DepartmentCode Enabled | 5/24/2016 11:22 AM | Actions ▽ |
| _CloneTest_EX2_ALA2 | ESTUDIO857 | T320SF0W1261 | Local Authentication | 5/24/2016 11:19 AM | Actions ▽ |
| _CloneTest_EX2_BP2 | ESTUDIO6560SC | T340SF0W1261 | DepartmentCode Enabled | 5/24/2016 11:22 AM | Actions ▽ |
| _CloneTest_EX2_WEISSH | ESTUDIO3555C | T212SF0W2170 | Local Authentication | 5/24/2016 2:39 PM | Actions ▽ |
| _CloneTest_OKI_LOIRE2 | ESTUDIO307 | T330SF0W1261 | LDAP Authentication | 5/24/2016 11:32 AM | Actions ▽ |
| _CloneTest_OKI_MOSSEL | ESTUDIO527 | T290SF0W2153 | NT Domain Authentication | 5/24/2016 11:24 AM | Actions ▽ |
| _CloneTest_OKI_STHELEN | ESTUDIO407 | T280SF0W2353 | DepartmentCode Enabled | 5/24/2016 11:10 AM | Actions ▽ |
| _JennyEBN | ESTUDIO2508A | T410SF0W1007 |  | 5/11/2016 12:36 PM | Actions ▽ |
| 0 | ESTUDIO6540 | T130SF0W4120 | te | 2/27/2017 2:34 AM | Actions ▽ |
| 000MasterCloneTest15663 | ESTUDIO3040771 | T140SF0W4000 | 000OriginalDescription | 3/4/2017 5:15 AM | Actions ▽ |

FIG. 4

Apply Master Clone

Select a master clone to be applied to all compatible devices that were selected.

| | File name | Model | Firmware | Description | Created On |
|---|---|---|---|---|---|
| ⦿ | z | ESTUDIO206 | T160SF0W2120 | | 3/25/2017 5:50 AM |
| ○ | testintg123456789 | ESTUDIO206 | T160SF0W2120 | <script>alert('xss')</script> | 3/9/2017 11:24 AM |
| ○ | test18_Edit-0312017 | ESTUDIO3555 | T212SF0W2153 | <script>alert('xss')</script> | 2/8/2016 10:19 AM |
| ○ | Test15 | ESTUDIO527S | T290SF0W2100 | | 2/8/2016 5:21 PM |
| ○ | Test14 | ESTUDIO527S | T290SF0W2100 | | 2/8/2016 5:21 PM |
| ○ | Test13 | ESTUDIO527S | T290SF0W2100 | testing | 2/8/2016 5:21 PM |
| ○ | Test1-23_ab.c | ESTUDIO206 | T160SF0W2120 | | 2/28/2017 2:11 PM |
| ○ | test121 | ESTUDIO6540 | T130SF0W4131 | | 3/20/2017 1:57 PM |
| ○ | Test12 | ESTUDIO527S | T290SF0W2100 | test12 | 3/8/2016 5:21 PM |
| ○ | Test11 | ESTUDIO527S | T290SF0W2100 | | 3/8/2016 5:21 PM |

Cancel     OK

FIG. 5

CLONING SYSTEM AND METHOD FOR MULTIFUNCTION PERIPHERALS

TECHNICAL FIELD

This application relates generally to a system and method for configuring multifunction peripherals. This application is more particularly directed to an automated system for creating and distributing a device clone file among networked multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are complex devices comprised of mechanical, electromechanical, electronic and digital components. Early on, MFPs were stand-alone units. Device problems required a technician to visit the premises to address them. New devices need to be configured to a particular user's needs. Software components, including embedded firmware, may need to be added, removed or updated. Many MFP users include larger firms that can have tens or hundreds of MFPs in one or more location. Devices may continually be brought in or out of service. Having a technician configure or update each device to a user's specifications can be extremely expensive and time consuming.

SUMMARY

In accordance with an example embodiment of the subject application, a system and method for multifunction peripheral cloning includes a device controller with a processor and associated memory and a network interface. Device configuration data is stored on the device for configuring device components such as a scan engine and a print engine. A controller processor generates a copy of the device configuration data and communicates it to at least one networked multifunction peripheral via the network interface.

In accordance with another example embodiment of the subject application, a multifunction peripheral device controller includes a processor and associated memory. Embedded devices, such as a scan engine, print engine or user interface, are configurable in accordance with device configuration data. A network interface receives a settings file from a networked device via the network interface which is stored in a memory. The processor configures the scan engine, print engine and user interface in accordance with the received settings file.

BRIEF DESCRIPTION OF THE DRAWINGS

Various embodiments will become better understood with regard to the following description, appended claims and accompanying drawings wherein:

FIG. 4 is an example embodiment of a master clone list;
and
FIG. 5 is an example embodiment of a master clone assignment list.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
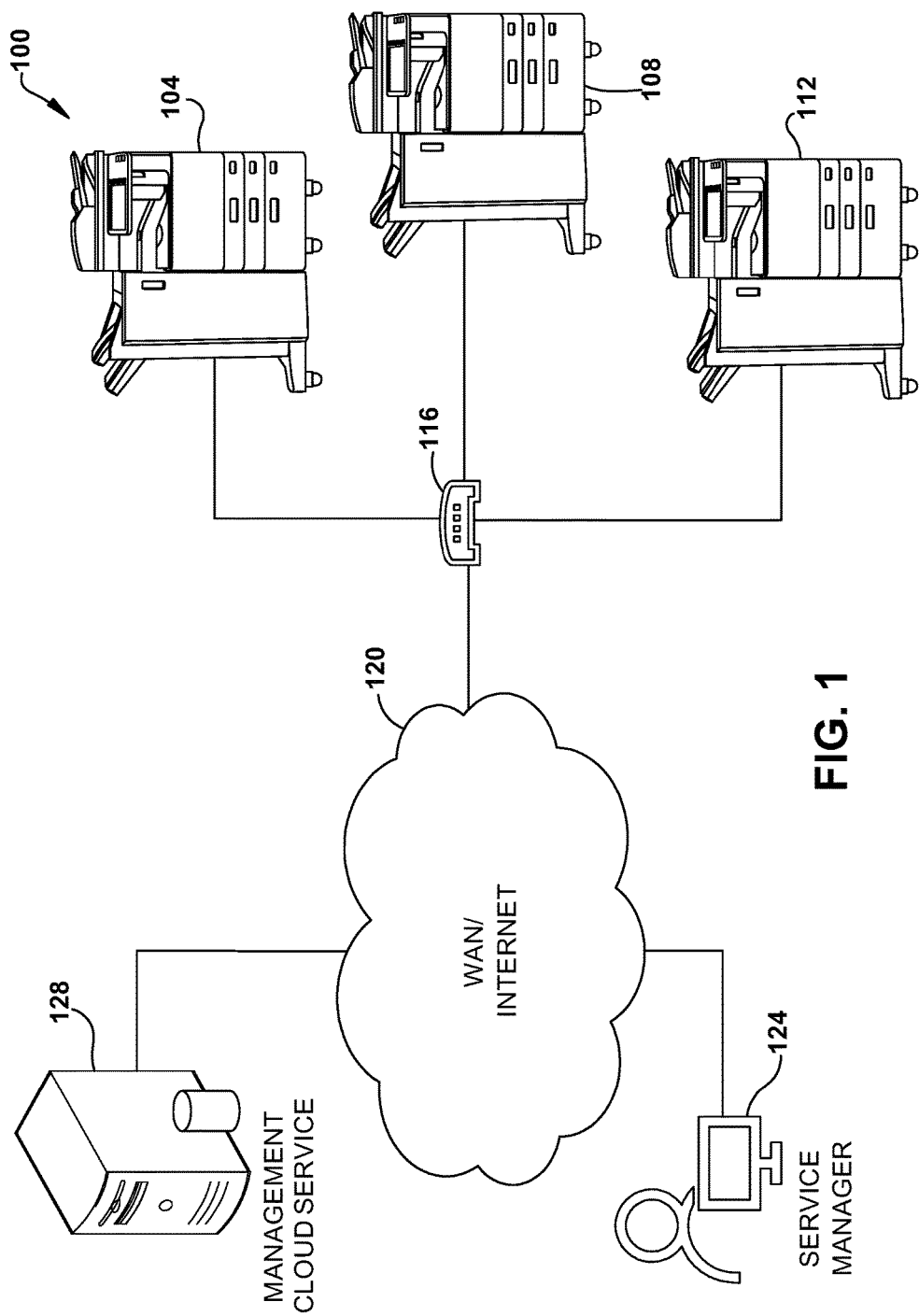
FIG. 1 an example embodiment of a cloning system.

In accordance with the subject application, FIG. 1 illustrates an example embodiment of a MFP device cloning system 100 including two or more MFPs as illustrated by MFPs 104, 108 and 112. MFPs are suitably connected for data communication among and between them with any suitable wireless or wired data interfaces. In the example embodiment of FIG. 1, the MFPs are members of a local area network (LAN) serviced by network router 116 which also suitably provides a gateway to a wide area network (WAN) 120 which suitably comprises data communication via the Internet. MFP service manager 124 can access MFP configurations via any suitable network connection. Remote connection can allow a technician to configure devices without the need to physically access them. While remote configuration is an improvement, it still requires a technician to login to each device to complete configuration. This would need to be done for each device each time a system-wide configuration modification is desired by a device user.

In the example embodiment of FIG. 1, a master clone file is created. The master clone file is comprised of an electronic backup file that contains MFP settings and may also include device firmware. Master clones are suitably created by a technician who accesses a device's web interface or a device management cloud service 128. To create a master clone through the device web interface, a service manager logs in to the web interface and requests for a master clone file to be created. The device creates the master clone file from its current settings and makes it available for download. To create a master clone through the device management cloud service 128, the service manager suitably logs in to the device management cloud service 128 and requests for a master clone to be created. The device then creates a master clone and uploads it to the device management cloud service 128. Master clones can then be applied to other devices through their web interfaces or the device management cloud service 128. This allows multiple MFPs to be quickly and easily created to mirror a source device's settings.

By way of further example, in the illustration of FIG. 1, a service manager 124 designates a leader MFP device and one or more follower MFPs. In the example, MFP 104 is designated as the leader device which, in turn, creates a master clone and uploads it to device management cloud service 128. Each follower device, MFPs 108 and 112 in the illustrated example, periodically check for a new master clone on the leader device. This may be accomplished at any suitable schedule which may be set on each MFP or following a prompt from device management cloud service 128. If a follower device cannot find the leader device on the local area network, it suitably checks device management cloud service 128 for a new master clone. In ether event, if there is a new master clone, the follower device will download and apply the master clone.

Figure 2:
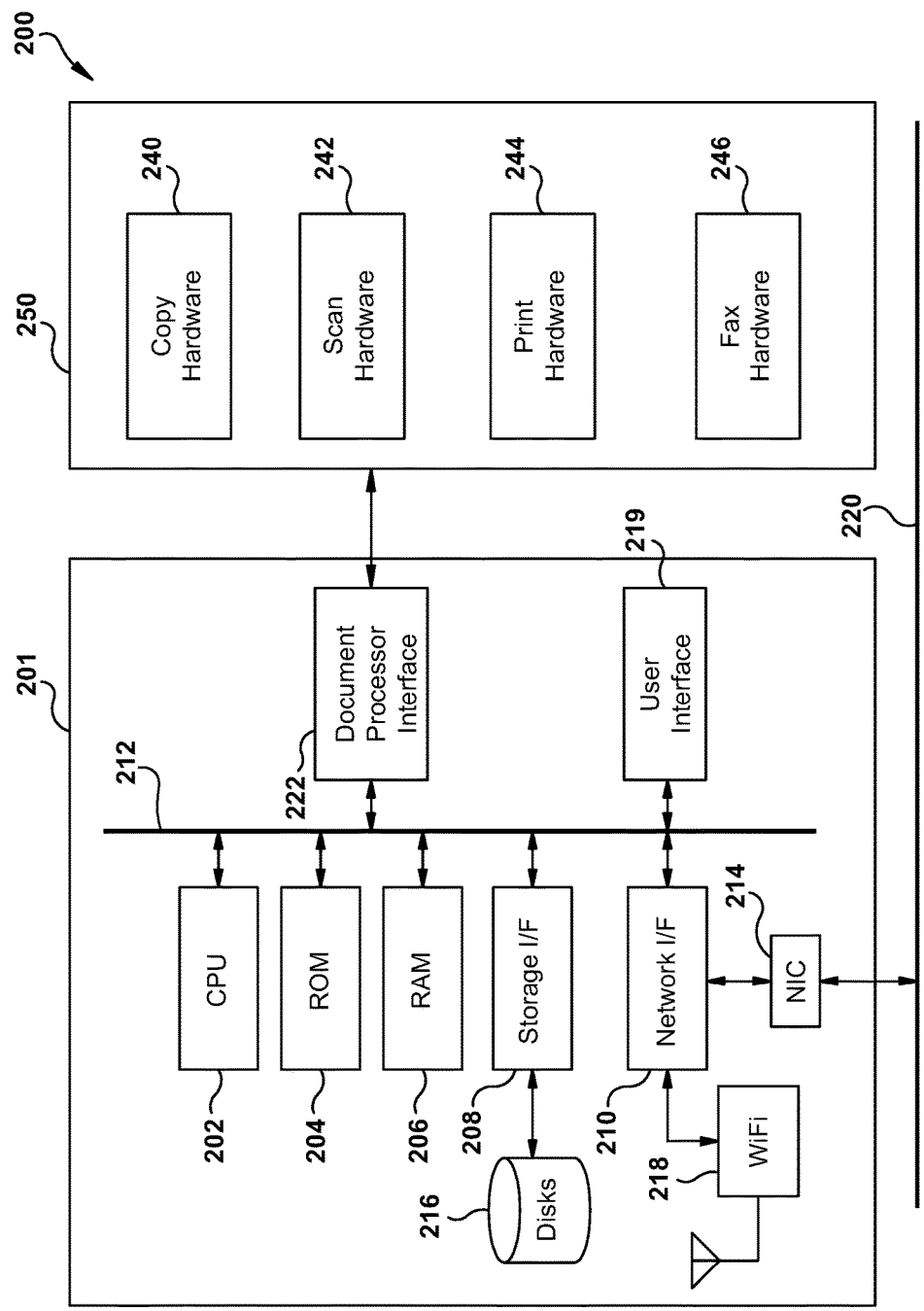
FIG. 2 is an example embodiment of functional device components of a multifunction peripheral.

Turning now to FIG. 2, illustrated are functional device components 200 suitably comprising a multifunctional peripheral such as MFPs 104, 108 and 112 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Hardware monitors suitably provide device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Figure 3:
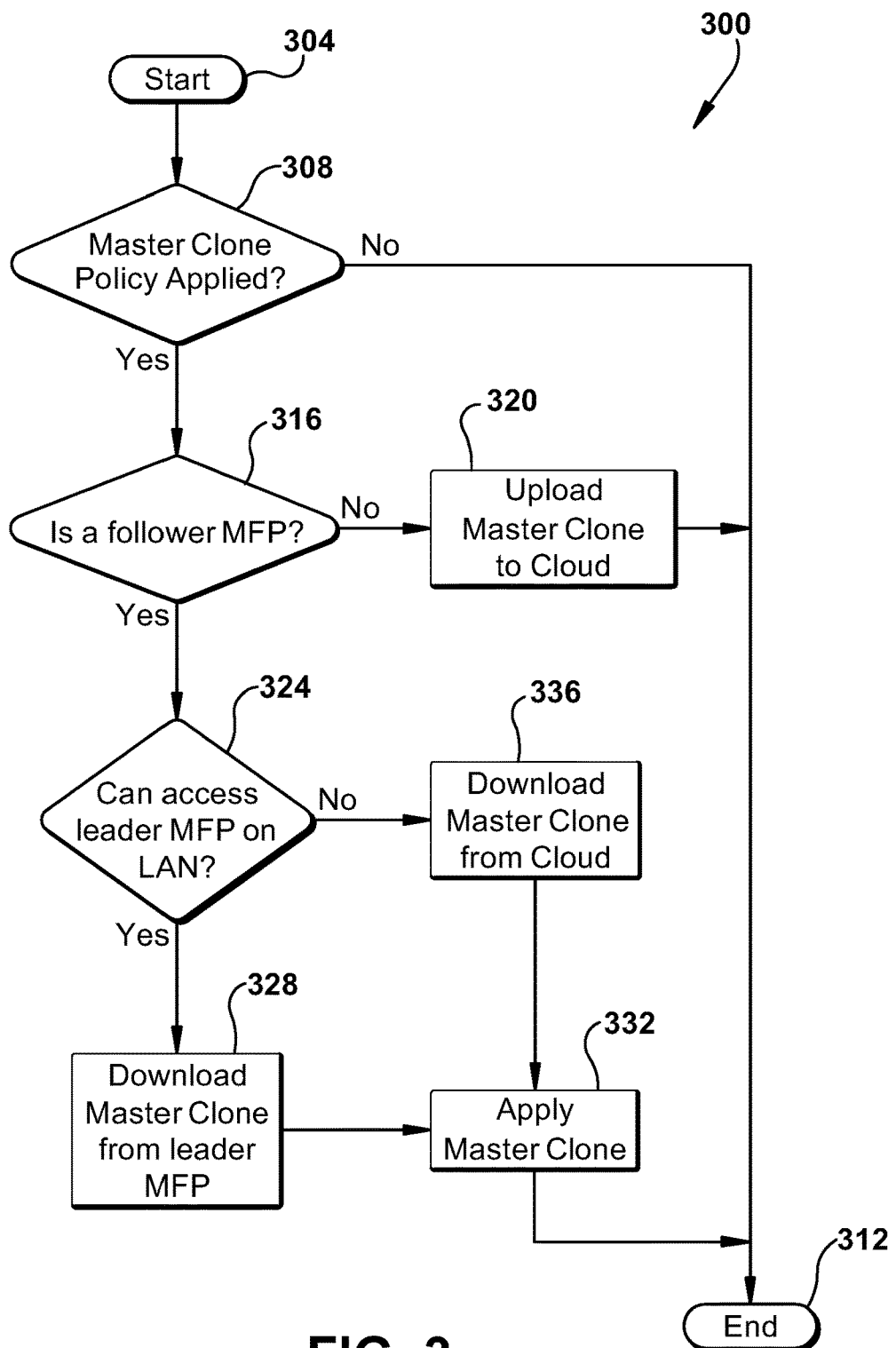
FIG. 3 is a flowchart of operations of an example embodiment of a device controller.

FIG. 3 is a flowchart of operations 300 of example embodiments of the device controllers in connection with the MFPs of FIG. 1. Each device commences the process at block 304 and a determination is made at block 308 as to whether a master clone policy has been implemented. If not, the process ends at block 312. If it determined that a master clone policy exists at block 308, then a determination is made as to whether the MFP is a follower at block 316. If not, then the device is designated a leader device and a master clone file is created and uploaded to the device management cloud service at block 320 and the process ends at block 312. If the device is designated as a follower as determined at block 316, then a determination is made as to whether the device can access a leader MFP at block 324. An identifier, such as a network address, of a leader MFP is suitably preset in each follower MFP, or placed in a network repository where it can be pulled by each follower MFP. Alternatively, when a device is designated as a leader MFP, it suitably broadcasts its identity to corresponding follower MFPs.

If the determination made at block 324 is that a leader MFP is accessible, or defined, then the master clone file is downloaded from the leader MFP at block 328 and this is applied to the device at block 332. The process then ends at block 312. If no leader MFP is accessible or defined, a master clone file is suitably downloaded from the device management cloud service at block 336 and this file is applied to the device instead at block 332. The process then terminates at block 312.

FIG. 4 illustrates an example embodiment of a master clone list 400 such as may be available to a service manager. Master clone files are identified in column 410 and a corresponding device type appears in column 420. A corresponding firmware version appears in column 430. A corresponding device description is suitably provided in column 440 and a creation date for a current master clone file appears in column 450. In the illustrated example, there may be more than one leader clone device.

A device may serve as a leader for a subset of devices, such as those devices that are identical to it or devices that are located on a particular premises. Leader devices may also be selected to balance workloads for distribution of clone files when a large number of follower devices exist.

FIG. 5 illustrates an example embodiment of a master clone assignment list 500 such as may be available to a service manage. Column 510 lists compatible devices and a corresponding model type appears at column 520. Firmware versions appear in column 530 and a description may be provided at column 540. Finally, a creation date is suitably specified at column 550.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed:

1. A multifunction peripheral comprising:
   a device controller including a processor and associated memory configured to store device configuration data;
   a network interface;
   the processor configured to reconfigure the multifunction peripheral with received configuration data;
   a scanner configured in accordance with received configuration data;
   a printer configured in accordance with the received configuration data;
   wherein, when the multifunction peripheral is designated as a leader, the processor is further configured to
   generate a cloning copy of a device configuration of the reconfigured multifunction peripheral,
   receive a cloning copy request from each of a plurality of networked multifunction peripherals;
   communicate the cloning copy of the device configuration data to each of the plurality of networked multifunction peripheral via the network interface responsive to each cloning copy request, and upload the cloning copy to an associated cloud server;
wherein, when the multifunction peripheral is designated as a follower, the processor is further configured to
send a cloning file request to a designated leader multifunction peripheral,
send a cloning file request to a cloud server when no cloning file is received responsive to a cloning file request to the designated leader multifunction peripheral,
receive a cloning file, and
reconfigure the multifunction peripheral with a received cloning file,
wherein the controller is configured to scan a tangible document into electronic form via operation of the configured scanner;
wherein the controller is configured to print a tangible document from an electronic document via operation of the configured printer.

2. The multifunction peripheral of claim 1 wherein the memory further stores received device identification data for each networked multifunction peripheral, and
wherein the processor is further configured to send each copy of the received device configuration data to each networked multifunction peripheral in accordance with the device identification data.

3. The multifunction peripheral of claim 1 wherein the memory stores data corresponding to a synchronization schedule, and
wherein the processor is further configured to communicate each copy of the cloning file to each networked multifunction peripheral in accordance with the synchronization schedule.

4. The multifunction peripheral of claim 1 wherein the clone file is comprised of device configuration data copied from memory firmware.

5. A method comprising:
storing received device configuration data in a memory of a multifunction peripheral;
reconfiguring the multifunction peripheral in accordance with received device configuration data, the reconfiguring including
configuring a scanner of the multifunction peripheral in accordance with the received device configuration data and,
configuring a printer of the multifunction peripheral in accordance with the received device configuration data;
when the multifunction peripheral is designated as a leader,
generating a cloning copy of a device configuration of the reconfigured multifunction peripheral via a processor,
uploading the cloning copy to an associated cloud server,
receiving a cloning copy request from each of a plurality of networked multifunction peripherals, and
communicating the cloning copy to each requesting networked multifunction peripheral via a network interface;
when the multifunction peripheral is designated as a follower
sending a cloning file request to a designated leader multifunction peripheral,
sending a cloning file request to the cloud server when no cloning file is received responsive to the cloning file request sent to the leader multifunction peripheral,
receiving a cloning file, and
reconfiguring the multifunction peripheral with a received cloning file,
scanning a tangible document into electronic form with a configured scanner; and
printing a tangible document from an electronic document with a configured printer.

6. The method of claim 5 further comprising:
storing device identification data for each networked multifunction peripheral in the memory; and
sending cloning file to each networked multifunction peripheral in accordance with corresponding device identification data.

7. The method of claim 6 further comprising:
storing data corresponding to a synchronization schedule; and
communicating the cloning copy to each networked multifunction peripheral in accordance with the synchronization schedule.

* * * * *